(12) United States Patent
Knight et al.

(10) Patent No.: US 11,198,518 B1
(45) Date of Patent: Dec. 14, 2021

(54) SYSTEM FOR LIFTING AND TRANSPORTING AN AIRCRAFT

(71) Applicant: AGE Logistics Corporation, Monrovia, CA (US)

(72) Inventors: Mark Knight, Farnborough (GB); Russ Kobaly, Sewickley, PA (US); Jim Sameth, Monrovia, CA (US)

(73) Assignee: AGE Logistics Corporation, Monrovia, CA (US)

( * ) Notice: Subject to any disclaimer, the term of this patent is extended or adjusted under 35 U.S.C. 154(b) by 0 days.

(21) Appl. No.: 16/901,792

(22) Filed: Jun. 15, 2020

(51) Int. Cl.
| | |
|---|---|
| *B64F 1/22* | (2006.01) |
| *B66F 3/35* | (2006.01) |
| *B64F 5/40* | (2017.01) |
| *B64D 3/00* | (2006.01) |

(52) U.S. Cl.
CPC ............... *B64F 1/228* (2013.01); *B64D 3/00* (2013.01); *B64F 1/227* (2013.01); *B66F 3/35* (2013.01); *B64F 5/40* (2017.01)

(58) Field of Classification Search
CPC .... B66F 3/24; B66F 3/247; B66F 3/25; B66F 3/35; B66F 3/40; B64F 5/00; B64F 5/10; B64F 5/40; B64F 5/50; B64F 1/228; B64F 1/227
See application file for complete search history.

(56) References Cited

U.S. PATENT DOCUMENTS

| | | | |
|---|---|---|---|
| 3,185,238 A * | 5/1965 | Coates | B66F 3/35 180/125 |
| 3,513,935 A | 5/1970 | Noble | |
| 3,822,761 A | 7/1974 | Vaughen | |
| 4,237,992 A * | 12/1980 | Bristow | E04G 1/14 180/116 |
| 4,397,054 A | 8/1983 | Lee, Jr. | |
| 4,461,455 A * | 7/1984 | Mills | B64F 5/50 180/125 |

(Continued)

FOREIGN PATENT DOCUMENTS

JP 59163230 9/1984

OTHER PUBLICATIONS

AMS Aircraft Lifting Airbags. AMS Aircraft Recovery Ltd. (Published at least as early as Jun. 14, 2020).

(Continued)

*Primary Examiner* — Tyrone V Hall, Jr.
*Assistant Examiner* — Makenas S Markman
(74) *Attorney, Agent, or Firm* — Jeffrey G Sheldon; Katherine B. Sales; Cislo & Thomas LLP (57) ABSTRACT

A system for lifting and transporting an aircraft comprising a trailer, a lower and an upper inflatable airbag system and a plurality of ties. The trailer can comprise a rigid frame having an upper surface and a lower surface and a plurality of hook ups for attaching ties to the aircraft, at least one pair of wheels. The lower inflatable airbag system is configured for placement below the lower surface of the trailer and the upper inflatable airbag system is configured for placement above the upper surface of the trailer. A method of using the system comprises placing the system underneath the aircraft, inflating the airbag systems, attaching the wheels to the frame of the trailer, securing the aircraft to the trailer, deflating the lower inflatable airbag system, and transporting the aircraft.

17 Claims, 8 Drawing Sheets

(56) References Cited

U.S. PATENT DOCUMENTS

| | | | |
|---|---|---|---|
| 8,317,452 B2 * | 11/2012 | Lundin | B60G 9/02 |
| | | | 414/482 |
| 9,327,751 B2 | 5/2016 | Nou et al. | |
| 9,580,188 B2 | 2/2017 | Endres | |
| 10,093,450 B2 | 10/2018 | Embleton et al. | |
| 2010/0294175 A1 | 11/2010 | Cummins et al. | |
| 2014/0217343 A1 * | 8/2014 | Sefrin | B66F 17/00 |
| | | | 254/93 HP |
| 2018/0141792 A1 * | 5/2018 | Baas | B66F 3/35 |

OTHER PUBLICATIONS

AMS Fuselage Lifting System (FLS). AMS Aircraft Recovery Ltd. (Published at least as early as Jun. 14, 2020).
Aircraft Transporter System. AMS Aircraft Recovery Ltd. (Published at least as early as Jun. 14, 2020).
Pictures of Boom Fingers used by the Navy. (Published at least as early as Jun. 14, 2020).
Schematic Drawing of Boom Fingers used by Navy. (Published at least as early as Jun. 14, 2020).
Aircraft Recovery System from Vetter & PT Hydraulics Australia. Dec. 26, 2012. https://www.youtube.com/watch?v=v5S0kG4SfpE.
U.S. Appl. No. 16/992,325, Office Action dated Jan. 25, 2021.14 pages.

* cited by examiner

SYSTEM FOR LIFTING AND TRANSPORTING AN AIRCRAFT

BACKGROUND

Aircraft can suffer landing gear failures, which can result from a hard landing, or as a result of a runway excursion. It is necessary to place the damaged aircraft on jack(s) in order to restore the missing or damaged landing gear.

However, jacks cannot be placed under the forward fuselage as there is insufficient clearance. A method of raising the aircraft is therefore needed, and in many cases, time is of the essence. Existing methods and systems for lifting a disabled aircraft typically utilize large cranes which can take several hours to hours to arrive and require a significant amount of free space around the aircraft in order to get into position and effectively lift the aircraft.

Accordingly, there is a need for an improved system and method for lifting and transporting an aircraft.

SUMMARY

The present invention satisfies this need.

A system for lifting and transporting an aircraft having features of the present invention improves over existing systems and methods and comprises a trailer and a lower inflatable airbag system.

The trailer can comprise a rigid frame having an upper surface and a lower surface and a plurality of hook ups for attaching ties to the aircraft, at least one pair of wheels configured to removably couple to the rigid frame The lower inflatable airbag system is configured for placement below the lower surface of the trailer for raising the trailer when the lower inflatable airbag system is inflated.

The upper inflatable airbag system is configured to placement above the upper surface of the trailer for raising the aircraft when the upper inflatable airbag system is inflated;

Optionally, the lower airbag system comprises a plurality of stacked airbags that are independently inflatable.

Optionally, the upper inflatable airbag system comprises a plurality of stacked airbags that are independently inflatable.

Optionally, the lower airbag system comprises a single airbag module with a plurality of interior compartments, each compartment capable of being inflated independently of the other compartments.

Optionally, the upper airbag system comprises a single airbag module with a plurality of interior compartments, each compartment capable of being inflated independently of the other compartments.

The airbags can be permanently coupled together.

Optionally, each airbag has a 15-ton capacity.

Optionally, the system further comprises a plurality of ties that are configured for removably securing the disabled aircraft to the trailer.

Optionally, the system further comprises a support preferably made of a rigid material having an upper surface and a lower surface, wherein the lower surface is configured for placement on a ground surface and the lower inflatable airbag system can be placed on the upper surface of the support.

Optionally, the system further comprises a tow bar that is typically coupled to an external surface of the trailer.

Optionally, each wheel further comprises a directional lock.

a method of using the system for lifting and transporting an aircraft comprises the steps of:

a) placing the system for lifting and transporting an aircraft underneath the aircraft;
b) inflating the lower inflatable airbag system;
c) inflating the upper inflatable airbag system;
d) attaching the pair of wheels to the frame of the trailer;
e) securing the aircraft to the trailer using the plurality of ties;
f) deflating the lower inflatable airbag system; and
g) after step (f), transporting the aircraft by exerting force on the trailer.

Step (f) is of course performed after step (b). Preferably steps (b)-(e) are in the order listed but can be performed in any order.

DRAWINGS

These and other features, aspects and advantages of the present invention will become better understood with reference to the following description, appended claims, and accompanying drawings where:

DESCRIPTION

As used herein, the following terms and variations thereof have the meanings given below, unless a different meaning is clearly intended by the context in which such term is used.

The terms "a" "an," and "the" and similar referents used herein are to be construed to cover both the singular and the plural unless their usage in context indicates otherwise.

As used in this disclosure, the term "comprise" and variations of the term, such as "comprising" and "comprises," do not exclude other components or steps.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a device disclosed in this disclosure will be determined by its intended use.

Referring now to the drawings, like reference numerals designate identical or corresponding features throughout the several views.

Figure 5:
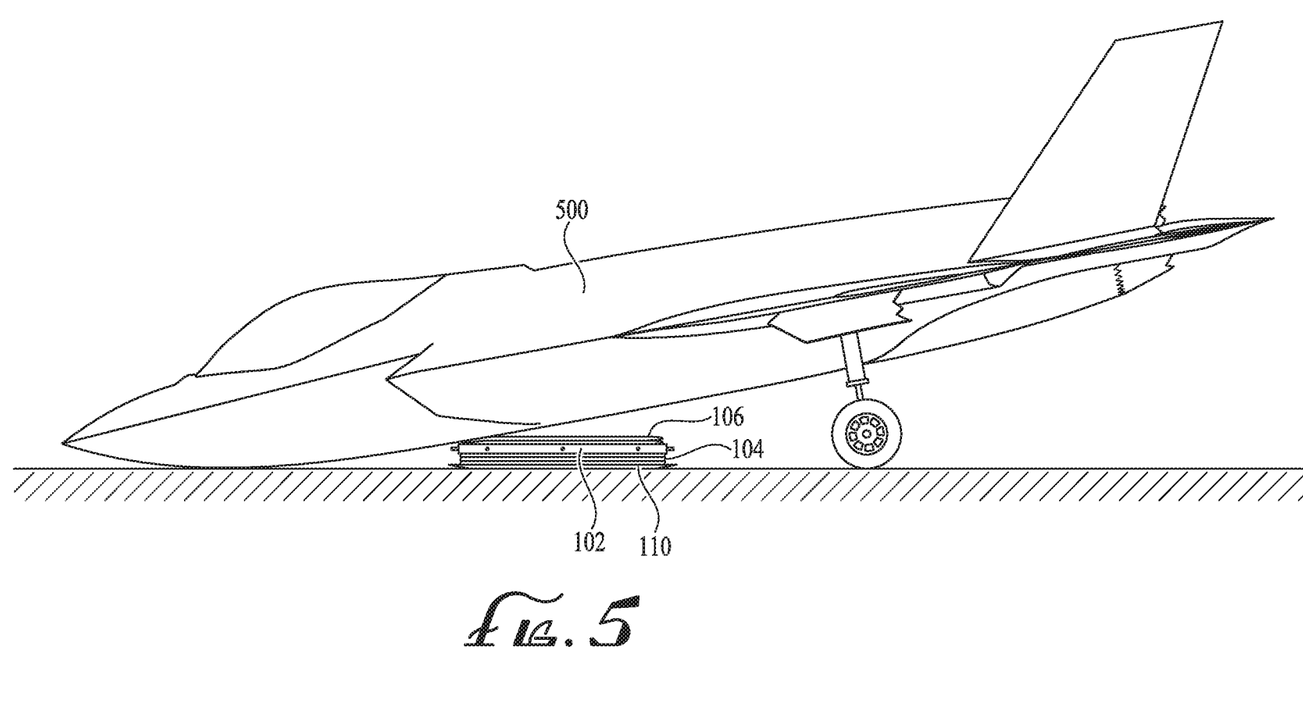
FIGS. 5-10 are side elevation views of the system of FIG. 1 as it is used for lifting the aircraft, FIGS. 5 through 10 showing sequential steps of using the system.
Figure 6:
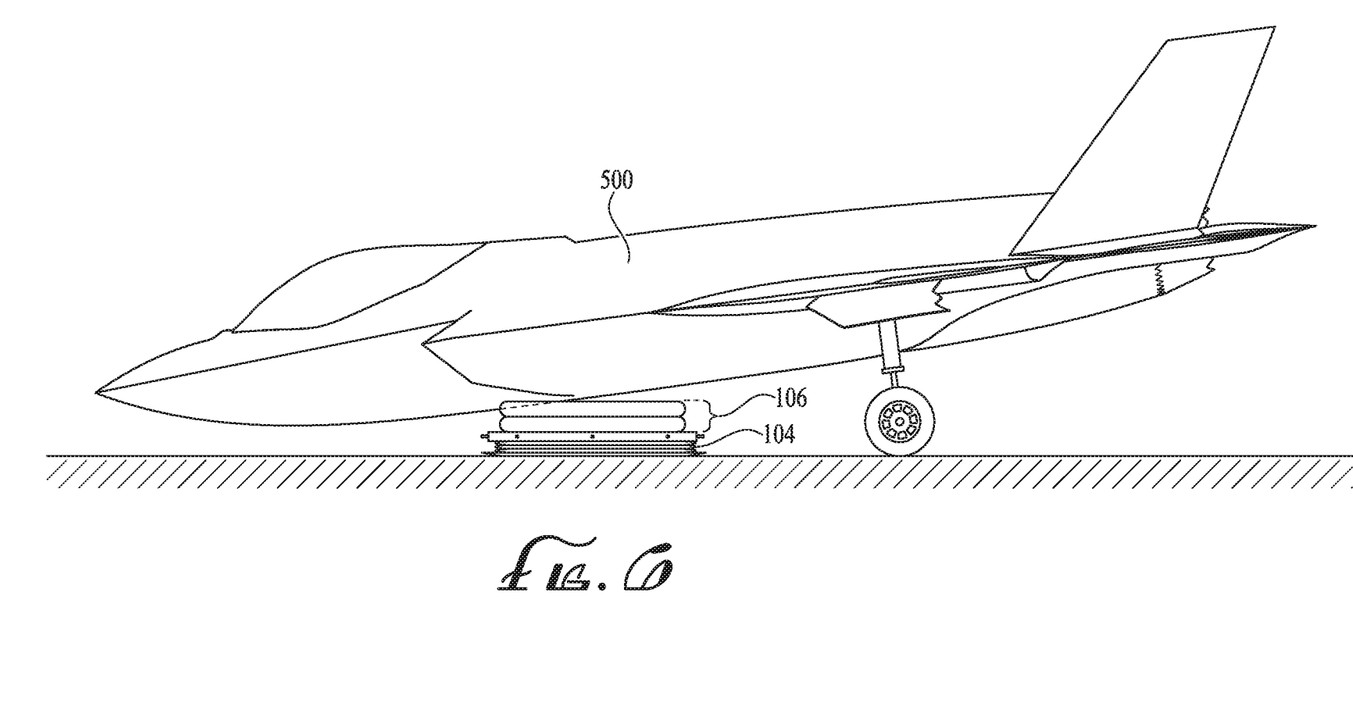
Figure 7:
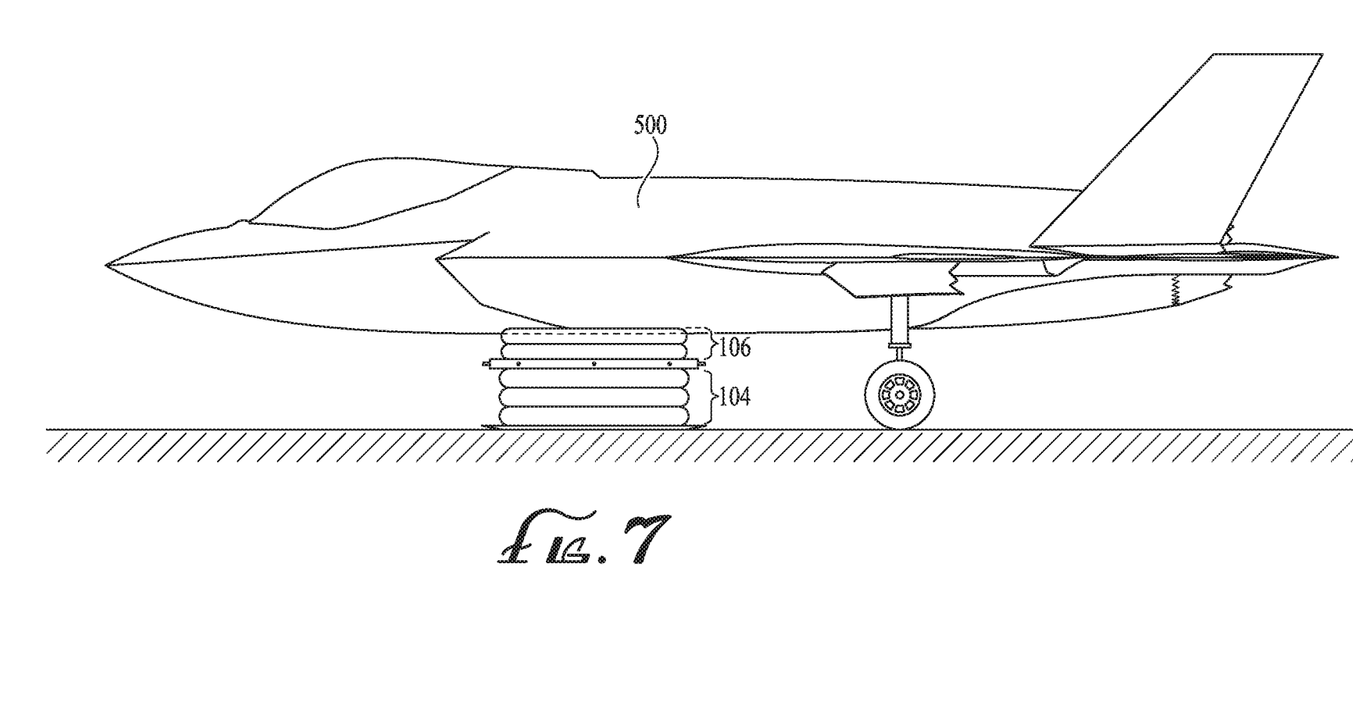
Figure 8:
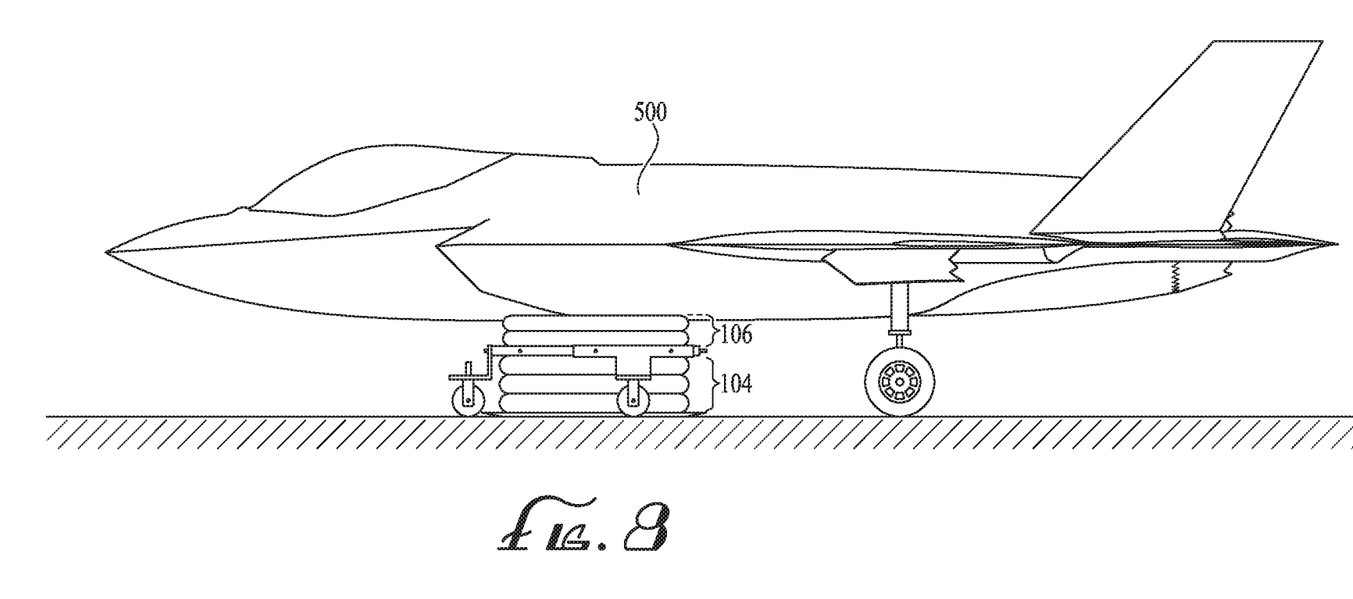

As noted above, and best seen in FIG. 5, when an aircraft 500 suffers from a nose landing, or a landing gear failure, there is little to no clearance under the nose of the aircraft 500, and the nose of the aircraft 500 must be lifted in order to transport the aircraft for repair. The sequential steps for performing this operation can be seen in FIGS. 5 through 10. The present invention is directed to solving this little to no clearance problem in a quick, efficient and cost-saving manner.

Figure 1:
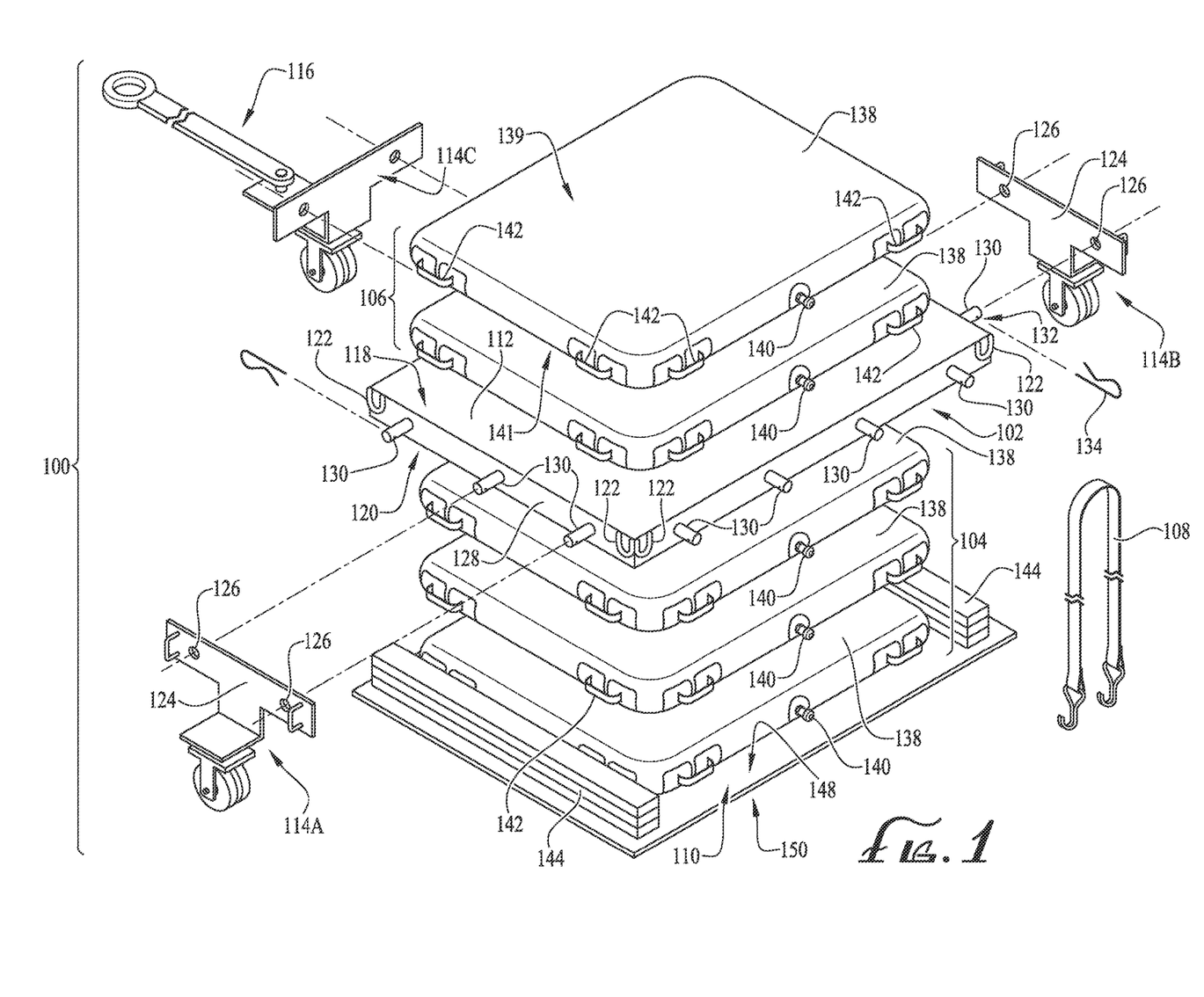
FIG. 1 is an exploded perspective view of a system for lifting and transporting an aircraft.

Referring to FIG. 1, there is shown one embodiment of a system 100 for lifting and transporting an aircraft. The system 100 comprises a trailer 102, a lower inflatable airbag system 104, an upper inflatable airbag system 106, a plurality of ties 108, and optionally, a support 110.

The trailer 102 is best seen in FIG. 1 and comprises a rigid frame 112 and at least one pair of wheels 114. Optionally, the system 100 can have a pivoting tow bar 116 that can be attached to the frame 112. The rigid frame 112 has an upper surface 118, a lower surface 120 and a plurality of hook ups 122 for attaching ties 108 to secure the aircraft 500 to the trailer 102. The hook ups 122 can comprise any structure for attaching ties 108 to the trailer 102, such as hooks, loops, O-rings/D-rings, clamps, and openings in the frame 112 for threading a tie 108 therethrough. The frame 112 is made from metal or a high strength composite.

Figures 2, 3, 4:
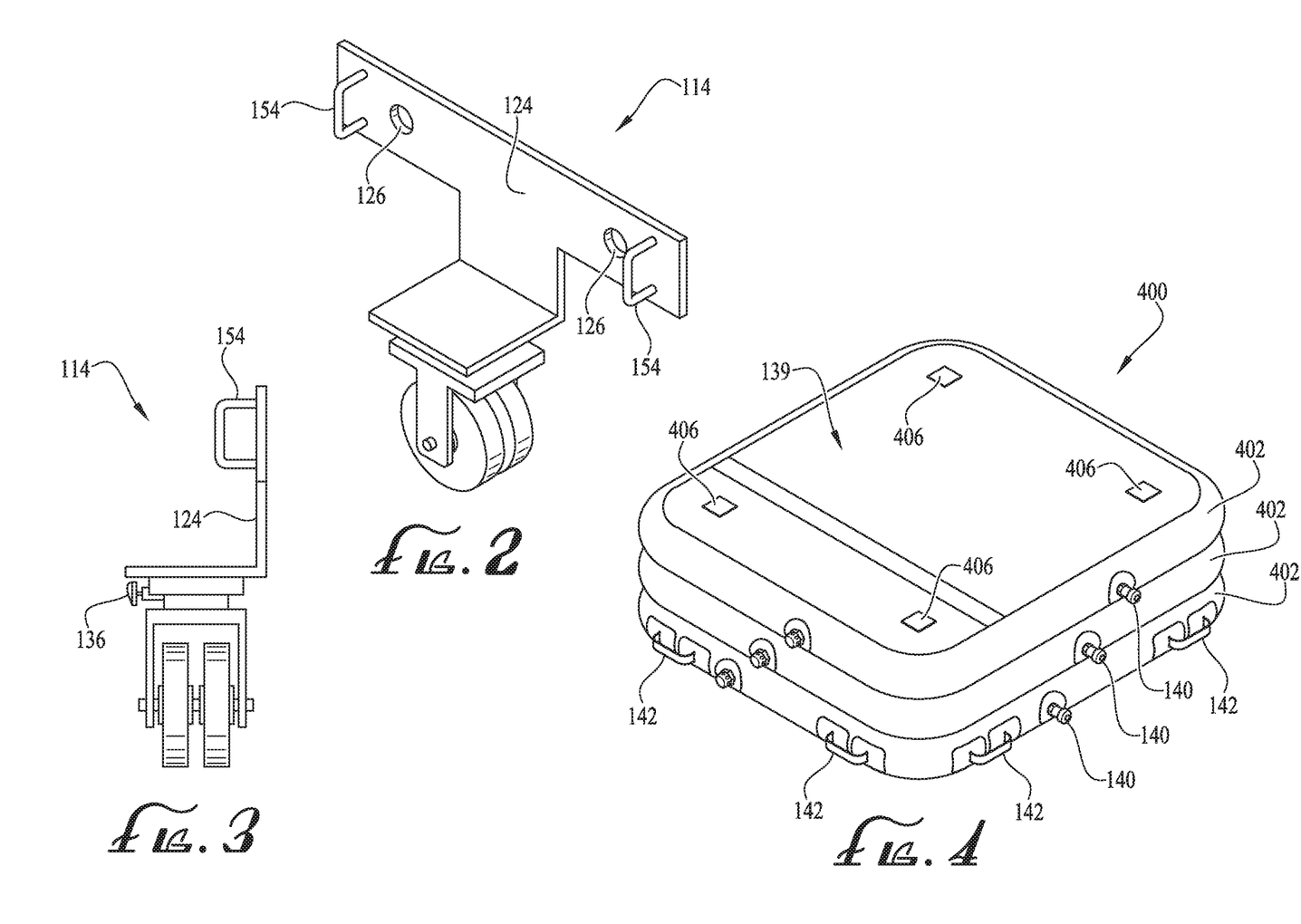
FIG. 2 is a perspective view of a wheel assembly of the system of FIG. 1.
FIG. 3 a front elevation view of the wheel assembly of FIG. 2.
FIG. 4 is a perspective view of an optional airbag system configuration for use with the system of FIG. 1.

Referring now to FIGS. 2 and 3, the pair of wheels 114 comprises first and second wheel assemblies 114A, 114B configured to be removably coupled to the rigid frame 112. Each wheel assembly 114A, 114B comprises a flat piece of metal or composite 124 with at least two openings 126 therethrough and at least one lift handle 152. The flat piece of metal 124 is configured for positioning up against an exterior surface 128 of the frame 112. The wheel 114 is rotatably coupled to the flat piece of metal 124 so that the wheel 114 can pivot and then roll in any direction. As best seen in FIG. 3, each wheel assembly 114 can have a directional wheel lock 136 for locking the corresponding wheel to perform straight line movement. Each wheel assembly 114 can also comprise at least one additional tie down location 154 in the form of a metal loop that projects from the flat piece of metal 124.

As best seen in FIG. 1, there are a plurality of rods 130 spaced around the exterior surface 128 of the frame 112 for coupling the wheels 114 thereto. Each rod 130 extends from the exterior surface 128 of the frame 112 and through the openings 126 in the flat piece of metal 124 of the corresponding wheel assembly 114. Each rod 130 has an opening 132 through its distal end for insertion of a lock pin 134 therethrough to prevent the wheel assembly 114 from disengaging from the rod 130. As there are a plurality of rods 130 spaced around the exterior surface 128 of the frame 122, the wheels 114 can be attached to any of the rods 130, permitting the user to adjust the position of the wheels 114 as necessary depending on the environment/situation. As noted above, more than one pair of wheels 114 can be coupled to the frame 122.

Optionally, the wheels 114 can be bolted to the frame 112 and the rods 130 are used as guide pins rather than a coupling mechanism. Optionally, no rods 130 are used at all.

As best seen in FIG. 1, the pivoting tow bar 116 is configured to be removably coupled to the exterior surface 128 of the frame 112. This allows the trailer 102 to perform multi-directional positioning under an aircraft. Because the trailer 102 can be pulled from any exterior surface 128 (and not just a front surface like a more traditional trailer), the trailer 102 is not limited to one specific placement for towing to be possible. Additionally, because the tow bar 116 is removable and repositionable on the frame 112, the direction of tow can be altered during operation. For example, the tow bar 116 can be coupled to a left side of the frame 112, used to pull the aircraft in one direction, and then the tow bar 116 can be removed from the left side of the frame 112 and coupled to a right side of the frame 112, and used to pull the trailer 102/aircraft 500 in a second direction. As shown in FIG. 1, the tow bar 116 can optionally be coupled to a third wheel assembly 1140, and the third wheel assembly 114C can removably couple to the frame 112. The third wheel assembly 1140 provides extra support for the trailer 102.

Optionally the tow bar can be permanently affixed to the frame 112.

Preferably the trailer 102 is sufficiently strong to support a load of at least 40 tons (80000 lbs), and the upper surface 118 has an area of 4.5 m×2.3 m (177"×90"). This allows the trailer 102 to be used with airbags of various sizes and capacities, irrespective of the manufacturer.

The lower inflatable airbag system 104 is configured for placement below the lower surface 120 of the trailer 102, and when the lower inflatable airbag system 104 is inflated, the trailer 102 is raised to towing height, such as about 20" to about 30" above ground surface. Once at trailer towing height, the trailer 102 has enough ground clearance for the wheels 114 to be coupled to the trailer 102. The upper inflatable airbag system 106 is configured for placement above the upper surface 118 of the trailer 102 and when the upper inflatable airbag system 106 is inflated, the aircraft 500 is raised to aircraft towing height. Optimal towing height of the aircraft 500 is the height the aircraft 500 would normally sit at if the landing gear were functional and supporting the aircraft 500. This height will vary depending on the type of aircraft but is typically around 44 inches. However, it is possible that that towing height can be less than 44 inches and the aircraft 500 can be in a slightly nose-down configuration, rather than a normal "landing gear functional" height.

Optionally, both the lower airbag system 104 and or the upper airbag system 106 each comprises a plurality of stacked airbags 138 that are independently inflatable. The plurality of stacked airbags 138 can be completely independent of each other, removably coupled together, or permanently coupled together. By permanent it is meant that the airbags 138 cannot be separated without making it impossible to deflate or inflate the airbags 138, or, the airbags 138 have a common surface. Patches of hook and loop fasteners 406 can be used to stack and removably hold the airbags 138 in contact with each other. FIG. 4 shows the hook and loop fasteners 406 on an airbag 400.

Optionally, the top-most airbag 138, 402 in the upper airbag system 106 is a contoured or a split-top bag to aid in contouring or shape adaption to an aircraft 500 with wings that have steep dihedral angles.

Optionally, the upper surface 139 of the top-most airbag 138, 402 of the upper airbag system 102 is a non-slip surface to aid in gripping the aircraft 500. Optionally, the lower surface 141 of the upper airbag system 106 is also a non-slip surface to aid in gripping the upper surface 118 of the trailer 102.

Optionally, as best shown in FIG. 4, the lower airbag system 104 and or the upper airbag system 106 or both each comprises a single airbag module 400 with a plurality of interior compartments 402, each compartment 402 capable of being inflated independently of the other compartments 402.

The airbags 138, 400, 402 used in the airbag systems 104, 106 can have any capacity and be made from any semi-flexible material, but preferably the airbags 138, 400, 402 have a 15-ton capacity and are made from a woven neoprene coated reinforced fabric. This fabric provides a long life expectancy and maintains high stability and durability during operation. Optionally, the fabric of the airbags 138, 400, 402 can be coated with other material such as, but not limited to, polyurethane or polyvinyl chloride (PVC). Each airbag 138, 400, 402 can have a lifting height of 200 mm (8 inches). As noted above, a plurality of airbags 138, 400, 402 can be used to achieve the necessary lift height for the specific aircraft being lifted. Each airbag 138, 400, 402 can be inflated individually, giving the operator complete control over the lifting of the aircraft 500 as well as maintaining the maximum amount of rigidity. For safety, each airbag 138, 400, 402 can be fitted with a pressure relief valve to prevent accidental over inflation. Inlet valves 140 with a non-return valve allow a filling hose to be disconnected without the airbag 138, 400, 402 deflating.

Optionally, each airbag 138, 400, 402 has two inlet valves 140, where one of the valves 140 is fitted with a pressure relief valve and the other valve 140 is fitted with an inflation coupling that attaches to the inflation hose. Optionally, each airbag 138, 400, 402 has at least one handle 142 coupled to an exterior surface so that a user can easily maneuver the airbags 138, 400, 402 into place.

Figure 9:
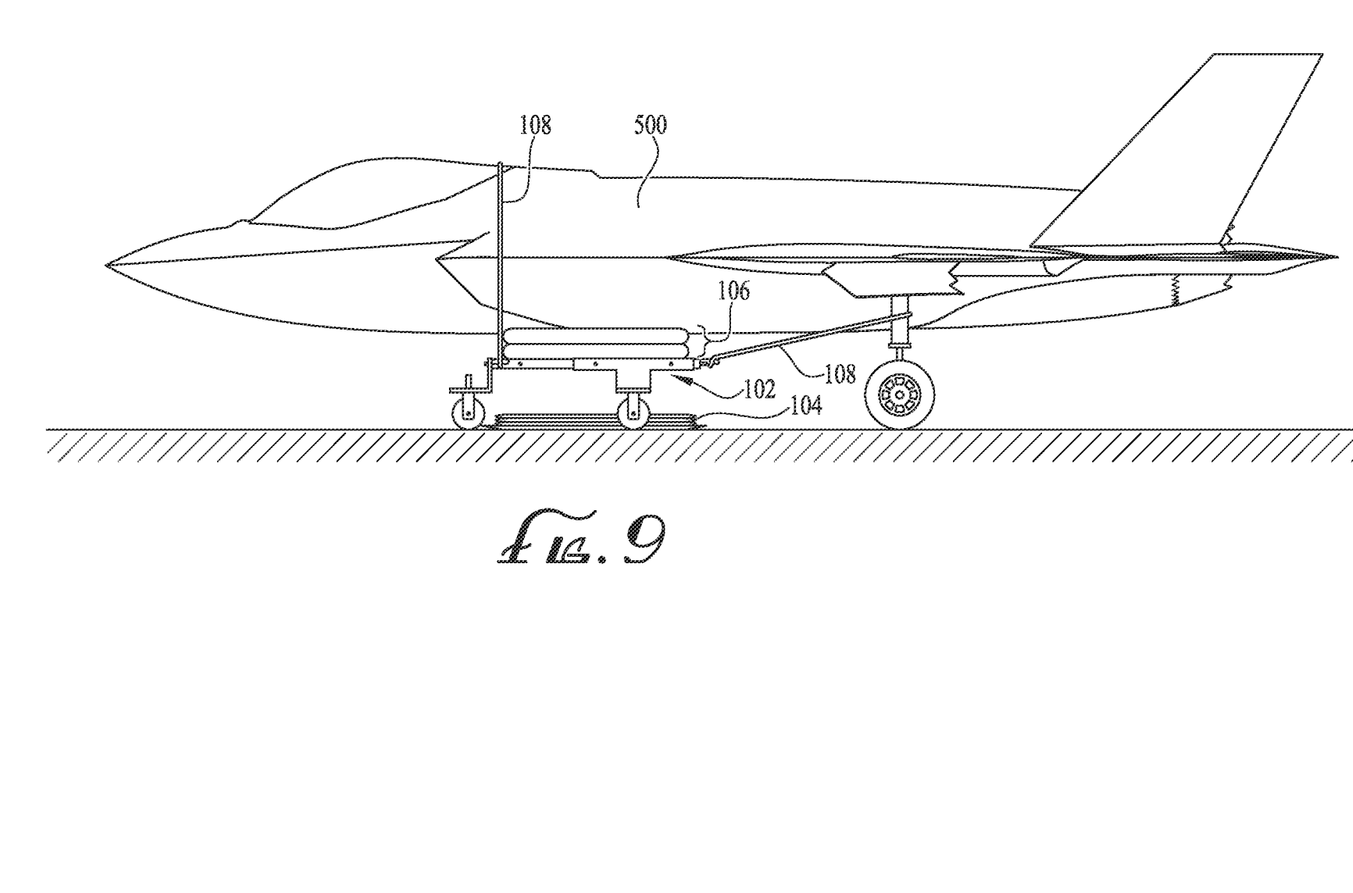
Figure 10:
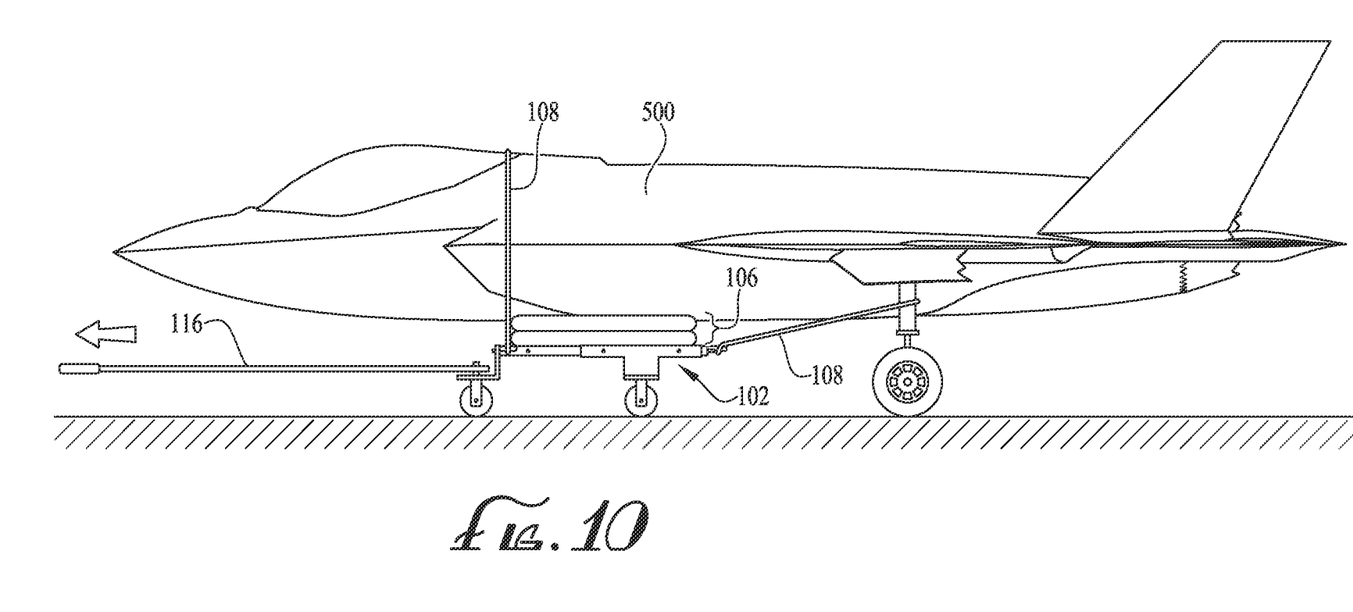

The plurality of ties 108 is used for removably securing the disabled aircraft 500 to the trailer 102. The ties 146 are shown in FIGS. 1, 9 and 10 and comprise any semi-flexible means to secure the aircraft 500 to the trailer 102, including but not limited to, straps, chains, cords, ropes, etc.

The support 110 comprises at least a section, and preferably the entire support 110, is made of at least one layer of rigid material. The support 110 has an upper surface 148 and a lower surface 150. The lower surface 150 of the support 110 is configured for placement on the ground surface and the lower inflatable airbag system 104 is configured for placement on the upper surface 148 of the support 110.

Optionally, at least one pair of side supports 144 is placed on top of the support 110, on either side of the lower airbag system 104. This is shown in FIG. 1. The side supports 144 provide a rigid surface for supporting the trailer 102 until the lower airbag system 104 inflates and the lower airbag system 104 can support weight of the trailer 102.

Referring now to FIGS. 5-10, a method of using the system 100 comprises:

a) placing the system 100 for lifting and transporting an aircraft underneath the aircraft 500;
b) inflating the upper inflatable airbag system 106;
c) inflating the lower inflatable airbag system 104;
d) attaching the plurality of wheels 114 to the frame of the trailer 102;
e) securing the aircraft 500 to the trailer 102 using the plurality of ties;
f) deflating the lower inflatable airbag system 104; and
g) transporting the aircraft 500 by exerting a force on the trailer 102.

Typically, the system 100 is placed under the aircraft 500, between main landing gear 502 and nose landing gear (not shown because the aircraft 500 suffered nose landing gear failure).

The system 100 of step a), may or may not include a support 110; as a support 110 may not be needed/used.

Optionally, in step b), the support 110 is placed on the around surface first, with the lower airbag system 104 placed on the upper surface 148 of the support 110, and at least one pair of side supports 144 can be placed on the upper surface 148 of the support 110, with the lower airbag system 104 positioned between the pair of side supports 144. This is shown in FIG. 1. As noted above, the side supports 144 provide a rigid surface for supporting the trailer 102 until the lower airbag system 104 inflates and can support the trailer 102.

Optionally, step d) can be performed before step c).

Optionally, before step g), step h) coupling a tow bar to an external surface of the frame.

Optionally, in step b) if the upper inflatable airbag system comprises a plurality of stacked airbags, the plurality of airbags can be inflated individually and sequentially, to slowly lift the nose of the aircraft off the ground surface. The same method can be used if the upper inflatable airbag system comprises a single airbag module with multiple internal compartments. The multiple internal compartments can be inflated individually and sequentially.

Optionally, in step c) if the lower inflatable airbag system comprises a plurality of stacked airbags, the plurality of stacked airbags are inflated individually and sequentially, so that the trailer is lifted slowly and in steps. The same method can be used if the lower inflatable airbag system comprises a single airbag module with multiple internal compartments. The multiple internal compartments can be inflated individually and sequentially.

Preferably steps (b)-(e) are in the order listed but can be performed in any order.

The invention has many advantages, including the following:

The system 100 as compared to conventional crane systems can be more quickly transported to a disabled or downed aircraft 500 suffering from landing gear failure because the components of the system 100 can fit into or be towed by a utility vehicle, such as a pick-up truck. Utility vehicles typically can travel at faster speeds than conventional crane systems. The system 100 can be deployed quickly. Since a utility vehicle is smaller and more agile than a large crane truck, the system 100 can be driven to an aircraft 500 that is in a hard location to reach. A prior art crane has a very difficult time reaching an aircraft 500 in a remote location.

The system 100 can be placed under a fuselage with very low ground clearance (12" or less). Initially, only the support 110, the trailer 102 and the lower and upper inflatable airbag systems 104, 106 need to fit under the fuselage;

The wheels 114 need only be attached to the trailer 102 after the trailer 102 has been lifted by the lower airbag system 104. This make the trailer 102 easier to move into place as the wheels 114 are not attached during system 100 installation.

The system 100 is lightweight for ease of positioning.

The cost to repair the system 100 is lower than repairing the traditional lifting crane because the airbags 138, 400 can be independently replaced if the systems uses independent airbags.

The wheels 114 have directional locking for straight-line movement. Without the directional lock engaged, the wheels 114 are free to rotate and move in any direction, giving the trailer 102 a wide range of motion.

The system 100 is capable of operation on soft or firm surfaces.

The system 100 is compatible with many standard airbags up to 40 ton.

The trailer 102 can be towed from all sides, making it highly adaptable to the environment the aircraft 500 must be recovered from.

The system 100 has a low initial cost and requires minimal maintenance as compared to the prior art cranes.

The system 100 has a low insertion height, making it ideal for lifting low clearance aircraft that have suffered landing gear failure.

The entire system 100 can be stored in a shipping container, making it easy to store and transport as no special equipment is required.

While particular forms of the invention have been illustrated and described, it will also be apparent to those skilled in the art that various modifications can be made without departing from the spirit and scope of the invention.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure.

What is claimed is:

1. A method for lifting and transporting a disabled aircraft having a fuselage across a ground surface, the method comprising the steps of:
   a) selecting a system for lifting and transporting the aircraft the system comprising:
      i) a towable, movable trailer configured to support the disabled aircraft, the trailer comprising a frame having an upper surface and a lower surface;
      ii) a support made of a rigid material and having an upper surface and a lower surface configured for placement on the ground surface;
      iii) at least one pair of wheels configured to be removably coupled to the trailer so that the trailer with the aircraft supported by the trailer can be transported;
      iv) only one lower inflatable airbag system on the upper surface of the support directly below the lower surface of the frame for raising the frame when the lower inflatable airbag system is inflated, the lower airbag system comprising a single stack of a plurality of airbags permanently coupled together or a single airbag module with a plurality of interior compartments, wherein each lower airbag has edges with the edges of the lower airbags vertically aligned, the lower inflatable airbag system being deflated;
      v) only one upper inflatable airbag system directly on the upper surface of the frame and positioned directly above the lower inflatable airbag system for raising the aircraft when the upper inflatable airbag system is inflated, the upper airbag system comprising a single stack of a plurality of airbags permanently coupled together or a single airbag module with a plurality of interior compartments, wherein each upper airbag has edges with the edges of the upper airbags vertically aligned, the upper inflatable airbag system being deflated; and
      vi) a tow bar configured to be removably coupled to the trailer for towing the trailer;
   wherein the system has a height that is 12 inches or less for fitting beneath the disabled aircraft;
   b) after step (a), placing the system below the aircraft with both the upper and lower inflatable airbag systems deflated, and the wheels not contacting the ground surface;
   c) after step (b) inflating the upper inflatable airbag system such that the upper inflatable airbag system is in direct contact with the fuselage of the aircraft;
   d) after step (b) and before or after step (c), inflating the lower inflatable airbag system for raising the trailer relative to the ground surface, wherein when the lower inflatable airbag system is inflated, the trailer is about 20 inches to about 30 inches above the ground surface;
   e) after step (d), coupling the wheels to the trailer and deflating the lower inflatable airbag system so that the wheels are in contact with the ground surface and the wheels are in a transportation position; and
   f) after step (e) moving the trailer for transporting the aircraft.

2. The method of claim 1, wherein step f) comprises transporting the aircraft by applying force on the trailer.

3. The method of claim 2, further comprising before step f), coupling the tow bar to the trailer.

4. The method of claim 1, wherein step c) comprises inflating the plurality of airbags individually and sequentially.

5. The method of claim 1, wherein step d) comprises inflating the plurality of airbags individually and sequentially.

6. The method of claim 1, further comprising before step f), the step of securing the aircraft to the trailer with ties attached to the hook-ups.

7. The method of claim 2, wherein step e) comprises deflating the lower airbag system a sufficient amount such that the wheels contact the ground surface and the upper airbag system remains inflated.

8. The method of claim 1, wherein a nose of the aircraft is sufficiently close to the ground surface that the wheels cannot be in a transportation position on the trailer prior to inflation of the lower airbag system.

9. The method of claim 1, wherein the hook ups comprise hooks, loops, O-rings, D-rings, clamps, and openings in the platform for threading a plurality of ties therethrough.

10. A method for lifting and transporting a disabled aircraft across a ground surface, the method comprising the steps of:
   a) selecting a system for lifting and transporting the aircraft the system comprising:
      i) a frame having an upper surface and a lower surface;
      ii) a support made of a rigid material and having an upper surface and a lower surface configured for placement on the ground surface;
      iii) at least one pair of wheels configured to be removably coupled to the frame so that the frame with the aircraft supported by the frame can be transported;
      iv) only one lower inflatable airbag system on the upper surface of the support directly below the lower surface of the frame for raising the frame when the lower inflatable airbag system is inflated, the lower airbag system comprising a single stack of a plurality of airbags or a single airbag module with a plurality of interior compartments, wherein each lower airbag has edges with the edges of the lower airbags vertically aligned, the lower inflatable airbag system being deflated;
      v) only one upper inflatable airbag system directly on the upper surface of the frame and positioned directly above the lower inflatable airbag system for raising the aircraft when the upper inflatable airbag system is inflated, the upper airbag system comprising a single stack of a plurality of airbags or a single airbag module with a plurality of interior compartments, wherein each upper airbag has edges with the edges of the upper airbags vertically aligned, the upper inflatable airbag system being deflated; and
      vi) a tow bar configured to be removably coupled to the frame for towing the frame;
   b) placing the system below the aircraft, wherein when both the upper and lower inflatable airbag systems are deflated, and the wheels are not positioned to contact the ground surface, the system has a height that is 12 inches or less for fitting beneath the disabled aircraft;
   c) after step (b) inflating the upper inflatable airbag system such that the upper inflatable airbag system is in direct contact with the fuselage of the aircraft;

d) after step (b) and before or after step (c), inflating the lower inflatable airbag system for raising the frame relative to the ground surface, wherein when the lower inflatable airbag system is inflated, the frame is about 20 inches to about 30 inches above the ground surface;
e) after step (d), coupling the wheels to the frame and deflating the lower inflatable airbag system and so that the wheels are in contact with the ground surface and the wheel are in a transportation position; and
f) after step (e) moving the frame for transporting the aircraft.

11. The method of claim 10, wherein step f) comprises transporting the aircraft by applying force on the frame.

12. The method of claim 11, further comprising before step f), coupling the tow bar to an external surface of the frame.

13. The method of claim 10, wherein step e) comprises deflating the lower airbag system a sufficient amount such that the wheels contact the ground surface and the upper airbag system remains inflated.

14. The method of claim 10, wherein a nose of the aircraft is sufficiently close to the ground surface that the wheels cannot be in the transportation position on the frame prior to inflation of the lower airbag system.

15. The method of claim 10, wherein the hook ups comprise hooks, loops, O-rings, D-rings, clamps, and openings in the platform for threading a plurality of ties therethrough.

16. A method for lifting and transporting a disabled aircraft across a ground surface, the method comprising the steps of:
   a) selecting a system for lifting and transporting the aircraft the system comprising:
      i) a ground support having an upper surface and a lower surface configured for placement on the ground surface;
      ii) a trailer comprising a frame having an upper surface and a lower surface;
      iii) at least one pair of wheels configured to removably couple to the trailer so that the trailer with the aircraft supported by the trailer can be transported;
      iv) only one lower inflatable airbag system configured for placement directly on the upper surface of the ground support directly below the lower surface of the trailer for raising the trailer when the lower inflatable airbag system is inflated, the lower inflatable airbag system comprising a single stack of a plurality of airbags or a single airbag module with a plurality of interior compartments, wherein each lower airbag has edges with the edges of the lower airbags vertically aligned, the lower inflatable airbag system being deflated; and
      v) only one upper inflatable airbag system configured for placement directly on the upper surface of the trailer for raising the aircraft when the upper inflatable airbag system is inflated, the upper inflatable airbag system comprising a single stack of a plurality of airbags or a single airbag module with a plurality of interior compartments, wherein each upper airbag has edges with the edges of the upper airbags vertically aligned, the upper inflatable airbag system being deflated; and
      vi) a tow bar configured to be removably coupled to the trailer for towing the trailer;
   b) after step a), placing the ground support on the ground surface;
   c) after step b) placing the lower airbag system on the ground support;
   d) after step c), placing the lower surface of the trailer on the lower airbag system;
   e) after step d), placing the upper airbag system on the upper surface of the trailer;
   f) after step e), positioning the system on the ground surface below the aircraft, wherein when both the upper and lower inflatable airbag systems are deflated, and the wheels are not positioned to contact the ground surface, the system has a height that is 12 inches or less for fitting beneath the disabled aircraft;
   g) after step (f) inflating the upper inflatable airbag system such that the upper inflatable airbag system is in direct contact with the fuselage of the aircraft;
   h) after step (f) and before or after step (g), inflating the lower inflatable airbag system, wherein when the lower inflatable airbag system is inflated, the trailer is about 20 inches to about 30 inches above the ground surface;
   i) after step (h), coupling the wheels to the trailer and deflating the lower inflatable airbag system so that the wheels are in contact with the ground surface; and
   j) after step (i) moving the trailer for transporting the aircraft.

17. The method of claim 16, wherein the hook ups comprise hooks, loops, O-rings, D-rings, clamps, and openings in the platform for threading a plurality of ties therethrough.

\* \* \* \* \*